US008167017B2

(12) United States Patent
Kolp et al.

(10) Patent No.: US 8,167,017 B2
(45) Date of Patent: May 1, 2012

(54) MULTI-MODE SYSTEM FOR DISPENSING ADHESIVE-BACKED LABELS

(75) Inventors: Benjamin J. Kolp, Derby, CT (US); David A. Beckstrom, Milford, CT (US); Mark E. Sievel, Newtown, CT (US)

(73) Assignee: Pitney Bowes Inc., Stamford, CT (US)

(*) Notice: Subject to any disclaimer, the term of this patent is extended or adjusted under 35 U.S.C. 154(b) by 271 days.

(21) Appl. No.: 12/618,093

(22) Filed: Nov. 13, 2009

(65) Prior Publication Data

US 2011/0114262 A1 May 19, 2011

(51) Int. Cl.

| | |
|---|---|
| ***B65C 9/00*** | (2006.01) |
| ***B29C 65/48*** | (2006.01) |
| ***B32B 37/00*** | (2006.01) |
| ***B32B 38/04*** | (2006.01) |
| ***B32B 38/10*** | (2006.01) |
| ***B32B 38/14*** | (2006.01) |
| ***B32B 43/00*** | (2006.01) |

(52) U.S. Cl. ........ 156/387; 156/510; 156/540; 156/759; 156/764; 156/767

(58) Field of Classification Search .......... 156/247–250, 156/257, 277, 289, 719, 384, 387, 510, 537, 156/540, 759, 764, 766, 767, DIG. 1, DIG. 24
See application file for complete search history.

(56) References Cited

U.S. PATENT DOCUMENTS

| | | | | |
|---|---|---|---|---|
| 3,710,667 | A * | 1/1973 | Kluger | 83/203 |
| 3,713,948 | A * | 1/1973 | Kluger | 156/351 |
| 3,852,139 | A * | 12/1974 | Jenkins | 156/250 |
| 4,024,011 | A * | 5/1977 | Crankshaw et al. | 156/299 |
| 4,025,382 | A * | 5/1977 | Del Rosso | 156/497 |
| 4,081,309 | A * | 3/1978 | Jenkins | 156/250 |
| 4,082,595 | A * | 4/1978 | Slater | 156/351 |
| 4,087,304 | A * | 5/1978 | Hamisch, Jr. | 156/384 |
| 4,210,484 | A * | 7/1980 | Crankshaw et al. | 156/542 |
| 4,366,023 | A * | 12/1982 | Voltmer | 156/542 |
| 4,475,978 | A * | 10/1984 | Bartl | 156/497 |
| 4,544,437 | A * | 10/1985 | Gibson | 156/751 |
| 4,671,843 | A * | 6/1987 | Olsen | 156/450 |
| 4,867,833 | A * | 9/1989 | McCoy | 156/361 |
| 4,931,127 | A * | 6/1990 | Matsumoto | 156/361 |
| 4,944,827 | A * | 7/1990 | Lilly et al. | 156/384 |
| 4,954,203 | A * | 9/1990 | Matsumoto | 156/361 |
| 5,040,461 | A * | 8/1991 | Van-Ocker | 101/288 |
| 5,116,452 | A * | 5/1992 | Eder | 156/566 |
| 5,133,827 | A * | 7/1992 | Ratermann | 156/361 |
| 5,167,752 | A * | 12/1992 | Dowling | 156/512 |
| 5,209,374 | A * | 5/1993 | Seidl-Lichthardt | 221/73 |

(Continued)

*Primary Examiner* — Sing P Chan
(74) *Attorney, Agent, or Firm* — Brian A. Collins; Charles R. Malandra, Jr.; Steven J. Shapiro

(57) ABSTRACT

A system for dispensing adhesive-backed labels includes a housing assembly defining a first dispensing outlet, a system for conveying a supply of label material along a feed path and a peeler bar, positionable from a first position to a second position, to effect an abrupt directional change in the feed path thereof, and cause the face material to separate from the liner material. A processor is employed to control the bi-directional displacement of the conveyance system and position the peeler bar within the housing such that the label material is: (i) conveyed downstream of the peeler bar when the peeler bar is in the first position, and (ii) drawn back across the peeler bar to cause a trailing edge of the face material to separate form the liner material when the peeler bar is in the second position.

20 Claims, 10 Drawing Sheets

U.S. PATENT DOCUMENTS

| | | | | |
|---|---|---|---|---|
| 5,221,405 | A * | 6/1993 | Trouteaud | 156/364 |
| 5,300,160 | A * | 4/1994 | Wilson et al. | 156/64 |
| 5,370,754 | A * | 12/1994 | Soloman | 156/64 |
| 5,405,482 | A * | 4/1995 | Morrissette et al. | 156/364 |
| 5,587,042 | A * | 12/1996 | St. Denis | 156/477.1 |
| 5,718,525 | A * | 2/1998 | Bruhnke et al. | 400/586 |
| 5,730,816 | A * | 3/1998 | Murphy | 156/64 |
| 5,785,798 | A * | 7/1998 | Horsman et al. | 156/361 |
| 5,853,530 | A * | 12/1998 | Allen | 156/541 |
| 5,902,449 | A * | 5/1999 | Moore | 156/541 |
| 5,938,890 | A * | 8/1999 | Schlinkmann et al. | 156/541 |
| 5,980,138 | A * | 11/1999 | Shiozaki et al. | 400/582 |
| 6,068,419 | A * | 5/2000 | Shiozaki et al. | 400/582 |
| 6,143,105 | A * | 11/2000 | Nash et al. | 156/64 |
| 6,179,030 | B1 * | 1/2001 | Rietheimer | 156/360 |
| 6,230,780 | B1 * | 5/2001 | Rietheimer | 156/577 |
| 6,261,009 | B1 * | 7/2001 | Petteruti et al. | 400/61 |
| 6,378,590 | B1 * | 4/2002 | Allen et al. | 156/542 |
| 6,428,227 | B2 * | 8/2002 | Petteruti et al. | 400/691 |
| 6,451,149 | B1 * | 9/2002 | McKenney et al. | 156/238 |
| 6,516,851 | B1 * | 2/2003 | Thatcher et al. | 156/357 |
| 6,991,130 | B2 * | 1/2006 | Presutti et al. | 221/73 |
| 7,017,820 | B1 * | 3/2006 | Brunner | 235/487 |
| 7,089,986 | B2 * | 8/2006 | Hayasaka et al. | 156/556 |
| 7,097,721 | B2 * | 8/2006 | Norris | 156/64 |
| 7,138,033 | B2 * | 11/2006 | Hayasaka | 156/304.3 |
| 7,871,009 | B1 * | 1/2011 | Blonigen et al. | 235/487 |
| 7,900,675 | B2 * | 3/2011 | Dangami et al. | 156/387 |
| 7,963,710 | B2 * | 6/2011 | Kobayashi et al. | 400/613 |
| 7,975,743 | B2 * | 7/2011 | Sleiman et al. | 156/358 |
| 7,985,170 | B2 * | 7/2011 | George | 493/375 |
| 2001/0026725 | A1 * | 10/2001 | Petteruti et al. | 400/691 |
| 2002/0088550 | A1 * | 7/2002 | Allen et al. | 156/497 |
| 2003/0098131 | A1 * | 5/2003 | Hayasaka et al. | 156/537 |
| 2003/0140804 | A1 * | 7/2003 | Korthauer | 101/288 |
| 2004/0050497 | A1 * | 3/2004 | Presutti et al. | 156/349 |
| 2004/0074582 | A1 * | 4/2004 | Davis et al. | 156/64 |
| 2005/0167623 | A1 * | 8/2005 | Yonekawa | 250/589 |
| 2006/0027332 | A1 * | 2/2006 | Dangami | 156/541 |
| 2006/0056900 | A1 * | 3/2006 | Itakura | 400/611 |
| 2006/0118571 | A1 * | 6/2006 | Presutti et al. | 221/73 |
| 2006/0132576 | A1 * | 6/2006 | Lowery et al. | 347/106 |
| 2006/0144521 | A1 * | 7/2006 | Esposito et al. | 156/361 |
| 2006/0185796 | A1 * | 8/2006 | Hayasaka et al. | 156/361 |
| 2006/0237125 | A1 * | 10/2006 | Montgomery et al. | 156/249 |
| 2006/0249258 | A1 * | 11/2006 | Painter et al. | 156/541 |
| 2007/0004575 | A1 * | 1/2007 | George | 493/405 |
| 2007/0039677 | A1 * | 2/2007 | Chapman | 156/64 |
| 2007/0095482 | A1 * | 5/2007 | Benton | 156/539 |
| 2007/0131344 | A1 * | 6/2007 | Tsujimoto et al. | 156/248 |
| 2008/0014344 | A1 * | 1/2008 | Fort et al. | 427/207.1 |
| 2008/0029221 | A1 * | 2/2008 | Dangami et al. | 156/379 |
| 2008/0047660 | A1 * | 2/2008 | Angel et al. | 156/238 |
| 2009/0028622 | A1 * | 1/2009 | Kobayashi et al. | 400/613 |
| 2009/0084503 | A1 * | 4/2009 | Kobayashi | 156/443 |
| 2009/0090469 | A1 * | 4/2009 | Painter et al. | 156/362 |
| 2009/0188613 | A1 * | 7/2009 | Fearn | 156/249 |
| 2011/0048608 | A1 * | 3/2011 | Dods et al. | 156/64 |

* cited by examiner

MULTI-MODE SYSTEM FOR DISPENSING ADHESIVE-BACKED LABELS

FIELD OF THE INVENTION

The present invention relates to apparatus for producing adhesive-backed labels, and more particularly, to a system for dispensing adhesive-backed labels in multiple operating modes.

BACKGROUND OF THE INVENTION

Conventional apparatus for producing and dispensing adhesive-backed labels include: (i) a device for printing information/symbology on the face of a label supply, i.e., a web/spool of a label face/liner material, and (ii) a cutting apparatus for separating the label face/liner material from the web/spool i.e., to produce a single adhesive-backed/lined label. While some of the label producing apparatus provide a stack of individually-printed labels ready for an operator to remove the liner (also referred to as the "backing material"), other label fabrication systems (oftentimes including a device known as "peeler bar") automatically separate the face material from the liner to provide an application-ready label. With regard to the former, it will be appreciated that the stack of labels facilitates application thereof at a subsequent time or at a remote location, i.e., not within the immediate vicinity of the label producing apparatus. However, the operator is tasked with removing the adhesive backed label from the liner at the time of application which can be a laborious/costly operation. With respect to the former, it will be appreciated that the automated system for separating the adhesive-backed label face from the liner can be complex, and does not provide the operator with the option of applying the label at a remote location. That is, an operator must apply individual labels immediately upon label dispensation.

Mailing machines are devices which may include a label fabrication and/or dispensing system for the purpose of applying postage to mailpiece envelopes. These machines often include an option to print and dispense postage indicia/franking symbology either; (i) directly on the face of a mailpiece envelope, or (ii) on an adhesive-backed label which can, thereafter, be applied to the mailpiece envelope. With respect to the latter, the option to print a postage indicia/franking label is often selected when the surface contour of the mailpiece envelope is irregular and printing directly on the face may result in a distorted image. Examples include envelopes having irregularly shaped content material, or those including a liner or layer to protect fragile content material ("bubble-wrap" protection).

These options are accommodated by a print station having at least one print head which is moveable, along rails or guides, from one feed path to another. In one operating mode, the print head is positioned in the feed path of a sealed/completed envelope to print on the face of the envelope, and, in another operating mode, the print head is positioned directly over the feed path of a supply/spool of label face/liner material. Once printed, the label is cut, accumulated and/or dispensed in the manner described above in connection with conventional label fabrication/dispensing systems.

In addition to the various shortcomings associated with conventional label fabrication/dispensing systems, mailing machines introduce the added complexity of printing currency on the labels which are fabricated. That is, inasmuch as the label fabrication systems commonly associated with mailing machines print currency, these systems must be highly reliable to prevent the operator from incurring additional cost as a result of a torn or damaged postage indica/franking label. It will be appreciated that, once debited from the vault of the mailing machine, a damaged or improperly printed/dispensed postage label cannot be easily/immediately credited without being validated by an authorized source, e.g., a Postal Authority.

A need, therefore, exists for a label fabrication and dispensing system which (i) accommodates multiple operating modes, i.e., labels dispensed with a liner intact or removed, (ii) facilitates the separation of the label face from the liner removal, (iii) minimizes complexity for added reliability and (iv) minimizes the propensity of damage to a postage indicia/franking label, i.e., when used in combination with a mailing machine.

SUMMARY OF THE INVENTION

A system is provided for dispensing adhesive-backed labels including a housing assembly defining a first dispensing outlet, a system for conveying a supply of label material along a feed path and operative to bi-directionally displace the label material along the feed path, and a peeler bar, positionable from a first position to a second position, to effect an abrupt directional change in the feed path thereof, and cause the face material to separate from the liner material. Separation of the face material from the liner material produces an application ready label. A processor is employed to control the bi-directional displacement of the conveyance system and position the peeler bar within the housing such that the label material is: (i) conveyed downstream of the peeler bar when the peeler bar is in the first position, and (ii) drawn back across the peeler bar to cause a trailing edge of the face material to separate form the liner material when the peeler bar is in the second position. Separation of the face material from the liner material produces an application ready label dispensed through the first dispensing outlet of the housing. In another operating mode, the label dispensing system produces a stream or stack of lined-labels which are dispensed through a second dispensing outlet for application at a subsequent time or at a remote location.

BRIEF DESCRIPTION OF THE DRAWINGS

Further details of the present invention are provided in the accompanying drawings, detailed description, and claims.

DETAILED DESCRIPTION

A system for dispensing and/or fabricating adhesive-backed labels are described herein. The invention is described in the context of a system for dispensing printed labels, a removable module for dispensing printed labels, and a system for fabricating and dispensing postage labels. The inventive teachings are also described in the context of a mailing machine for printing postage indicia/franking labels, although, it should be appreciated that any label producing and/or dispensing apparatus may be employed. A mailing machine merely provides an illustrative example of one embodiment of the invention, and should not be considered limiting when interpreting the meaning and/or scope of the appended claims.

Figure 1:
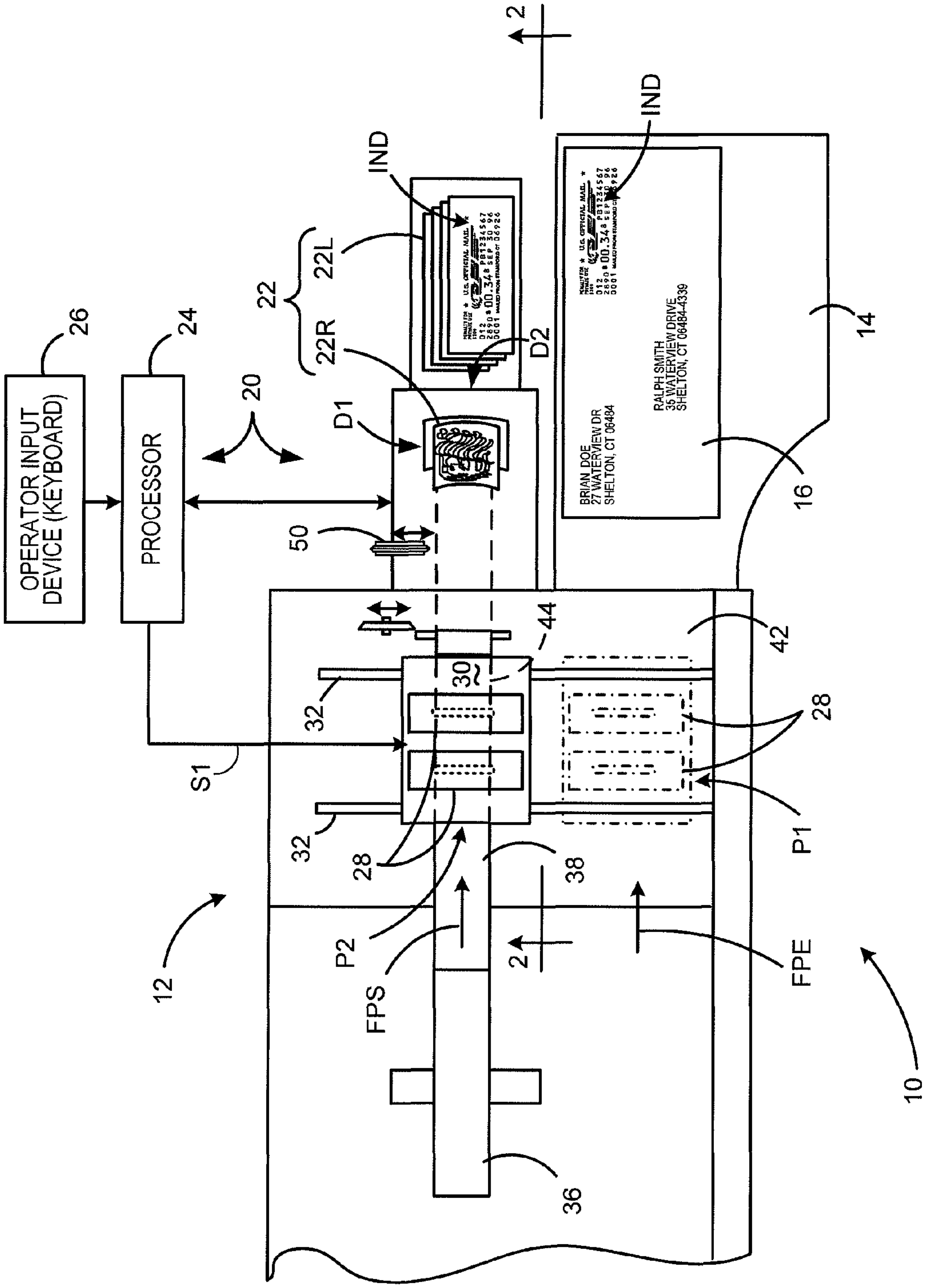
FIG. 1 is a top schematic view of a mailing machine including a positionable print head for printing along two feed paths, a first feed path for printing on the face of a mailpiece envelope, and a second feed path for printing on label material.

FIG. 1 depicts a schematic, broken-away top view of a mailing machine 10 according to the teachings of the present invention. In particular, the views illustrate a print station 12 in combination with a forward stacking tray 14 for receiving finished mailpieces 16, and a system 20 for dispensing adhesive-backed postage indicia/franking labels 22 (hereinafter referred to simply as "postage labels"). The postage labels 22 may be dispensed as application ready labels 22R, i.e., adhesive backed printed labels having the lining removed for immediate application, or as lined labels 22L, i.e., printed labels 22 with a liner to protect the adhesive backing of the printed label 22.

The mailing machine 10 and label dispensing system 20 of the present invention include a processor 24 which receives operator input through a conventional input device 26, e.g., a touch screen display, keyboard, etc., to control the various operations of the mailing machine 10 and label dispensing system 20. With regard to the mailing machine 10, these inputs may include information regarding the type of mailpieces being processed, their weight, (if the machine is not equipped with a scale, or weigh-on-the-way system), print resolution, vault information, encryption/security inputs, network information, etc. In addition to these inputs, the mailing machine 10 of the present invention includes an option to print postage indicia and/or franking symbology either: (i) on the face of the mailpiece envelope 16, or (ii) on the face of the postage label 22. This is achieved by mounting at least one of the print heads 28 on a moveable carriage 30/rail system 32 which extends orthogonally across the feed path FPE of the processed mailpiece envelope 16 or, the feed path FPS of a web/spool 36 of label material 38. More specifically, the processor 24 is operatively coupled to an actuator (not shown) in the print station 12 to reposition at least one of the print heads 28 along one of the feed paths FPE, FPS depending upon the option selected by the operator. In a first position P1 (shown in phantom lines), the print heads 28 are disposed across the feed path of finished mailpieces and print postage indicia directly on the face of the mailpiece envelope 16. In a second position P2, (shown in solid lines), the print heads 28 are positioned across the feed path FPS of the web/spool supply 36 to print the postage indicia on the face of the label material 38.

While not shown in the schematic illustrations, each feed path FPE, FPS includes a transport system for conveying the finished envelope 16 or supply of label material 38. An envelop transport system may include a series of rollers along an envelope transport deck 42 of the mailing machine 10 for conveying the finished mailpiece through the print station 12 to the stacking tray 14. Similarly, a label material transport system may include rollers (not shown) to pay-out the label material 38 along a label transport deck 44 through the print station 12 to the label dispensing system 20.

Before discussing the operation of the label dispensing system 20, it will be useful to provide a brief description of the various components and their arrangement within the mailing machine 10. In the described embodiment and referring to FIGS. 1 and 2, the print heads 28 of the mailing machine 10 print postage indicia on the label material 38 which includes an adhesive-backed face material 46 and a liner material 48 to protect and carry the adhesive-backed face material 46. It will be appreciated that the face material 46 is processed by the mailing machine 10 and label dispensing system 20 (i.e., printed, cut and dispensed) to produce the postage labels 22, i.e., either an application ready label 22R or a lined-label 22L. Once printed, the label material 38 is paid-out though an exit orifice EX of the mailing machine 10 and received by the label dispensing system 20.

The label dispensing system 20 includes a detachable housing 50 having a plurality of outlets D1, W, and D2 for dispensing (i) application-ready labels 22R (FIG. 1), i.e., printed labels having the liner material 48 removed for immediate application, (ii) waste material (not shown in FIGS. 1 and 2), i.e., liner material 48 and/or face material 46 which is produced following dispensation of the application-ready labels 22R, and (iii) lined labels 22L (see FIG. 1), i.e., adhesive-backed printed labels including the liner material 38 to protect the adhesive backing or carrier printed labels 22 along the internal feed path of the label dispensing system 20. A first dispensing outlet D1 is disposed through an upper portion of the housing 50 and is dedicated to dispensing the ready-to-use, or application ready printed labels 22R i.e., adhesive-backed labels without liner material 48. A waste outlet W is disposed through a lower portion of the housing 50, and is operative to remove waste material after dispensing the application ready label 22R from the first dispensing outlet D1. A second dispensing outlet D2 is disposed through an end portion of the housing 50 and is dedicated to dispense a stack or stream of lined labels 22 which can be removed for application at a subsequent time or at a remote location.

Figures 2, 2A, 2B:
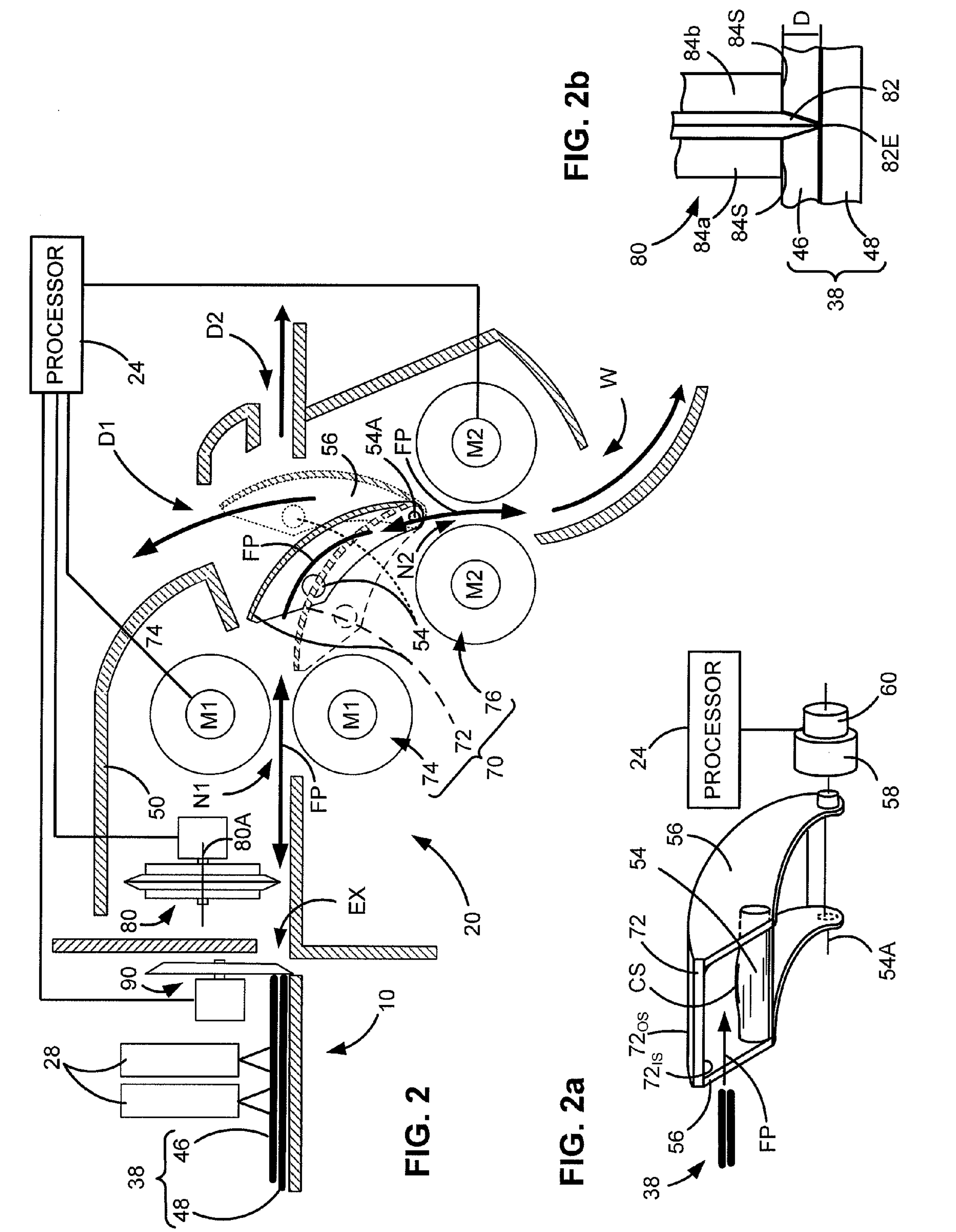
FIG. 2 is a side schematic view of the mailing machine from a perspective along line 2-2 of FIG. 1 depicting the relevant details of a label dispensing system including a system for bi-directionally displacing the label material along the feed path, and a peeler bar for effecting an abrupt directional change in the feed path thereof to separate a printed label from a backing or liner material.
FIG. 2*a* is an isolated perspective view of the peeler bar in combination with a deflector guide for receiving and guiding the liner material from a first pair of rollers to a second pair of rollers and/or through one of several outlets in the housing of the label dispensing system.
FIG. 2*b* is an enlarged, broken away front view of a cutting apparatus operative to produce a cut of a prescribed depth through the label material. (i.e., a kiss-cut)

In FIGS. 2 and 2*a*, the housing 50 is operative to support a repositionable peeler bar 54 and a conveyance system 70 for bi-directionally displacing the label material 38 across the peeler bar 54. More specifically, the peeler bar 54 is positionable from a first position (shown in solid lines) to a second position (shown in dotted lines) and is operative to engage the underside surface of the label material 38, i.e., frictionally engaging the liner material 48, to separate an application ready label 22R from the liner material 48 when dispensing the label 22R through the first dispensing outlet D1. In the described embodiment, the peeler bar 54 is mounted at each end to a pivot arm 56 which, in turn, mounts to an internal wall of the housing 50 about a pivot axis 54A. The processor 24 drives a rotary actuator 58 and receives feedback from a rotary encoder 60 to effect motion of, and accurately position, the pivot arms 56 and peeler bar 54. While the described embodiment employs a pair of pivot arms 56 to reposition the peeler bar 54, it will be appreciated that other mounting arrangements are contemplated. For example, the ends of the peeler bar 54 may slide within, and be guided along an elongate/arcuate slot (not shown) within the housing 50 and be repositioned by one or more linear actuators (also not shown).

The peeler bar 54 is generally cylindrical in shape and extends orthogonally across, or relative to, the feed path FP of the label material 38, but may include a convex peripheral surface CS along its length to impart a complimentary shape to the label material 38 as it passes over the peeler bar 54. While this will be described in greater detail hereinafter, suffice it to say at this juncture that the shape imparts additional stiffness to the adhesive-backed label 22 which facilitates separation and handling of the label 22.

The conveyance system 70 includes a pivotable deflector guide 72 disposed between a first pair of rollers 74 and a second pair of rollers 76. In the described embodiment, the deflector guide 72 is integrated with, and extends between, the pivot arms 56 which mount the peeler bar 54, although it should be appreciated that the deflector guide 72 may be independently mounted to the housing 50 and positioned by a separate actuation device. The deflector guide 72, therefore, pivots along with the peeler bar 54 and is controlled by the processor 24 through the rotary actuator 58 and encoder 60. In the illustrated embodiment, the first pair of rollers 74 are vertically oriented, i.e., rotate about axes which lie in a vertical plane, and define a first drive nip N1 which displaces the label material 38 along a substantially horizontal feed path FP. The second pair of rollers 76 are horizontally oriented, i.e., rotate about axes which lie in a horizontal plane, and define a second drive nip N2 which displaces the label material 38 along a substantially vertical feed path FP. While the first and second drive nips N1, N2 are substantially orthogonal to change the direction of the feed path from horizontal to vertical, it should be appreciated that other orientations are contemplated depending upon the location of the various outlets D1, W, D2.

Each pair of rollers 74, 76 may be driven by respective rotary drive motors M1, M2 which are controlled by the processor 24. The processor 24 can drive each of the motors M1, M2 and the respective rollers 74, 76 in either direction, i.e., to bi-directionally displace the label material 38 along the feed path FP and at the same or at variable speeds relative to each other. In this way, the label material 38 may be paid-out or drawn back at different rates of speed to increase or decrease the length of label material between each of the drive nips N1, N2.

Furthermore, the deflector guide 72, in combination with the rollers 74, 76 may be positioned to direct the label material 38, or liner material 48 thereof, from one of the pairs 74, 76 to the other of the pairs 74, 76, through one of the dispensing outlets D1, D2 or through the waste outlet W. Similar to the peeler bar 52, the deflector guide 72 is positionable from a first position (shown in solid lines in FIG. 2) to a second position (shown in dashed lines). In the first position, the deflector guide 72 is operative to receive the label material 38 from the first drive nip N1 and direct the label material 38 to the second drive nip N2. That is, the label material 38 enters an opening between the inner surface $\mathbf{72}_{IS}$ and the peeler bar 54 (see FIG. 2*a*) and is directed downwardly along the arcuate surface $\mathbf{72}_{IS}$ to the second drive nip N2. In the second position, the label material 38 rides above the upper or outer surface $\mathbf{72}_{OS}$ of the deflector guide 72 and is directed outwardly through the second dispensing outlet D2. These aspects of the invention will be discussed in greater detail when discussing the operation of the label dispensing system 20.

While the supply of label material 38 may include precut label material, i.e., a kiss-cut penetrating through the face material 46, the label fabrication system 20 may include a cutting apparatus 80 for the purpose of cutting the face material 46 to any length. That is, since the label transport rollers and drive rollers 74, 76 control the amount of label material 38 which is paid-out from the label supply 36, each postage label 22 may be cut to any size, e.g., from two (2) inches to eight (8) inches, depending upon the information to be printed. For example, some labels 22 may contain only the postage indicia while others may include barcode security or other symbology. In the described embodiment and referring to FIG. 2*b*, the cutting apparatus 80 includes a disc-shaped cutter 82 having circular cutting edge 82E and a rotational axis 80A parallel to the feed path FP of the label material 38. The disc-shaped cutter 82 includes one or more bearings 84*a*, 84*b* each defining a bearing surface 84S disposed radially inboard of the cutting edge 82E. The radial distance D from the cutting edge 82E to the bearing surface 84S controls the depth of the kiss-cut into the label material 38, i.e., through the face material 46. In the described embodiment, the bearing surfaces 84S are disposed on each side of the cutter 82 to more precisely control the depth of the kiss-cut.

In addition to the first cutting apparatus 80, a second cutting apparatus 90 may be disposed upstream thereof, to sever the label material 38, i.e., cut through the liner material 48 or through the combined face and liner materials 46, 48. This cutting apparatus 90 may be disposed in either the mailing machine 10 or in the label dispensing system 20 and may be controlled by the same processor 24 employed to control the position of the peeler bar 54, the conveyance system 70, and the first cutting apparatus 80. As will be described in greater detail when discussing the operation of the mailing machine 10 and label dispensing system 20, the second cutting apparatus 90 is principally employed to discard waste material following the dispensation of an application ready label 22R.

Figure 3:
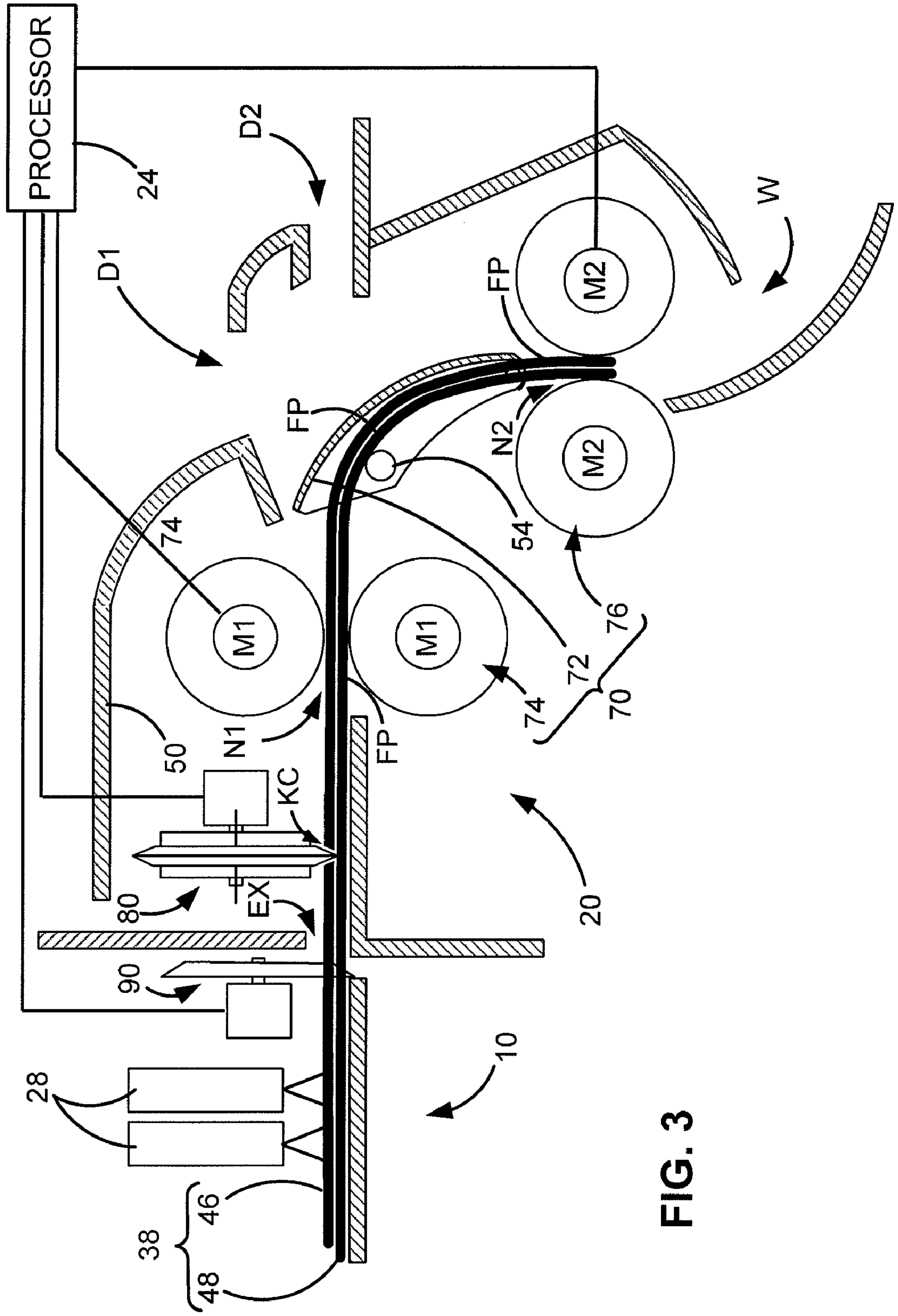
FIG. 3 depicts the label dispensing system in a first operating mode wherein the first cutting apparatus produces a kiss-cut through the width of the face material, i.e., immediately past or upstream of the print associated with a postage/franking indicia.
Figure 9:
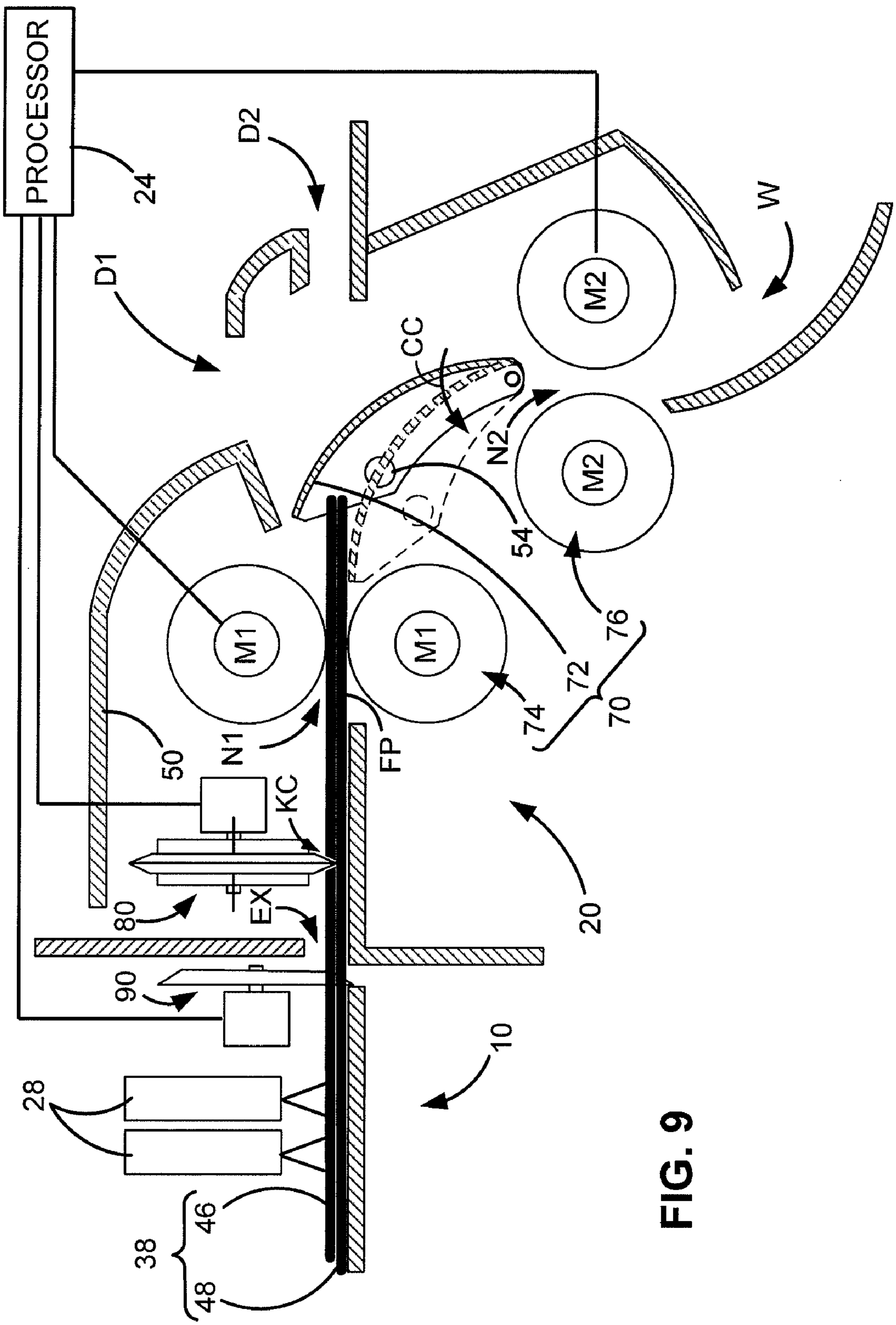
FIG. 9 depicts the label dispensing system in a second operating mode wherein the deflector guide is repositioned from a first position to a second position while the first cutting apparatus makes several kiss-cuts in the label material to produce a stream of lined labels.
Figure 10:
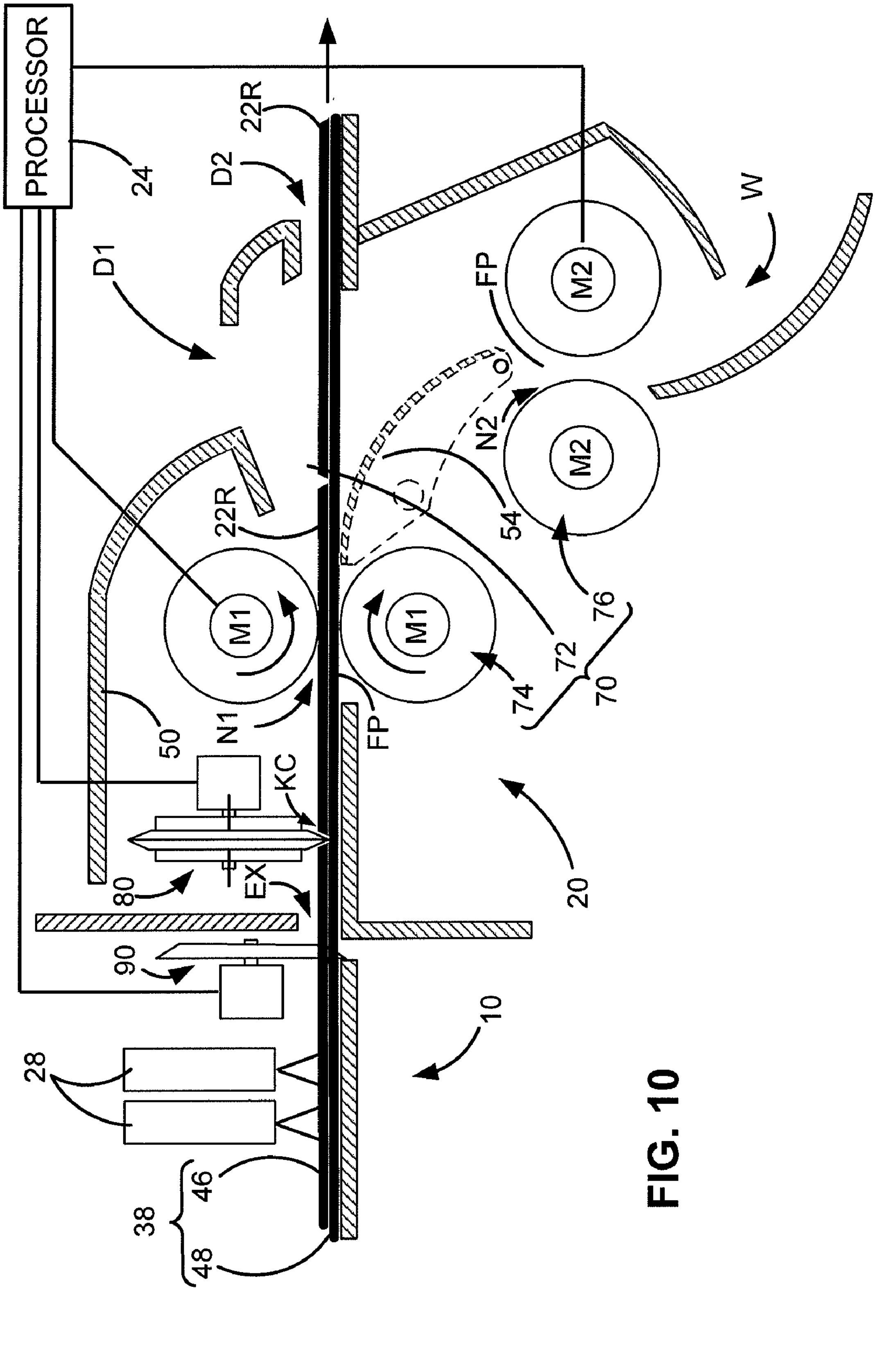
FIG. 10 depicts the label dispensing system in the second operating mode wherein the label material is guided and supported along an outer surface deflector guide for dispensing the lined labels through a second dispensing outlet in the housing

FIGS. 3 thorough 10 depict the operation of the label dispensing system 20 at various instants in time within one of several operating modes. These operating modes include: (i) a first operating mode associated with dispensing an application ready label 22R (FIGS. 3 through 6), (ii) another operating mode, which may be viewed as a sub-operation of the first operating mode, associated with discarding or dispensing waste material 38W (FIGS. 7 and 8), and (iii) a second operating mode associated with dispensing lined labels 22R as a stream or stack of individual labels (FIGS. 9 and 10). In FIG. 3, the label material 38 having a postage indicia printed thereon is paid-out through the exit EX of the mailing machine 10 along the feed path FP and through the first and second nips N1, N2 of the drive rollers 74, 76. More specifically, the deflector guide 72 is in its initial, or first position, and the inner surface $72_{IS}$ thereof has directed the label material downwardly through the second nip N2 of the second pair of drive rollers 76. In the frame shown in FIG. 3, the nips N1, N2 are paused (not driving) as the first cutting apparatus 80 produces a kiss-cut KC through the width of the face material 46, i.e., immediately past or upstream of the printed postage indicia.

Figure 4:
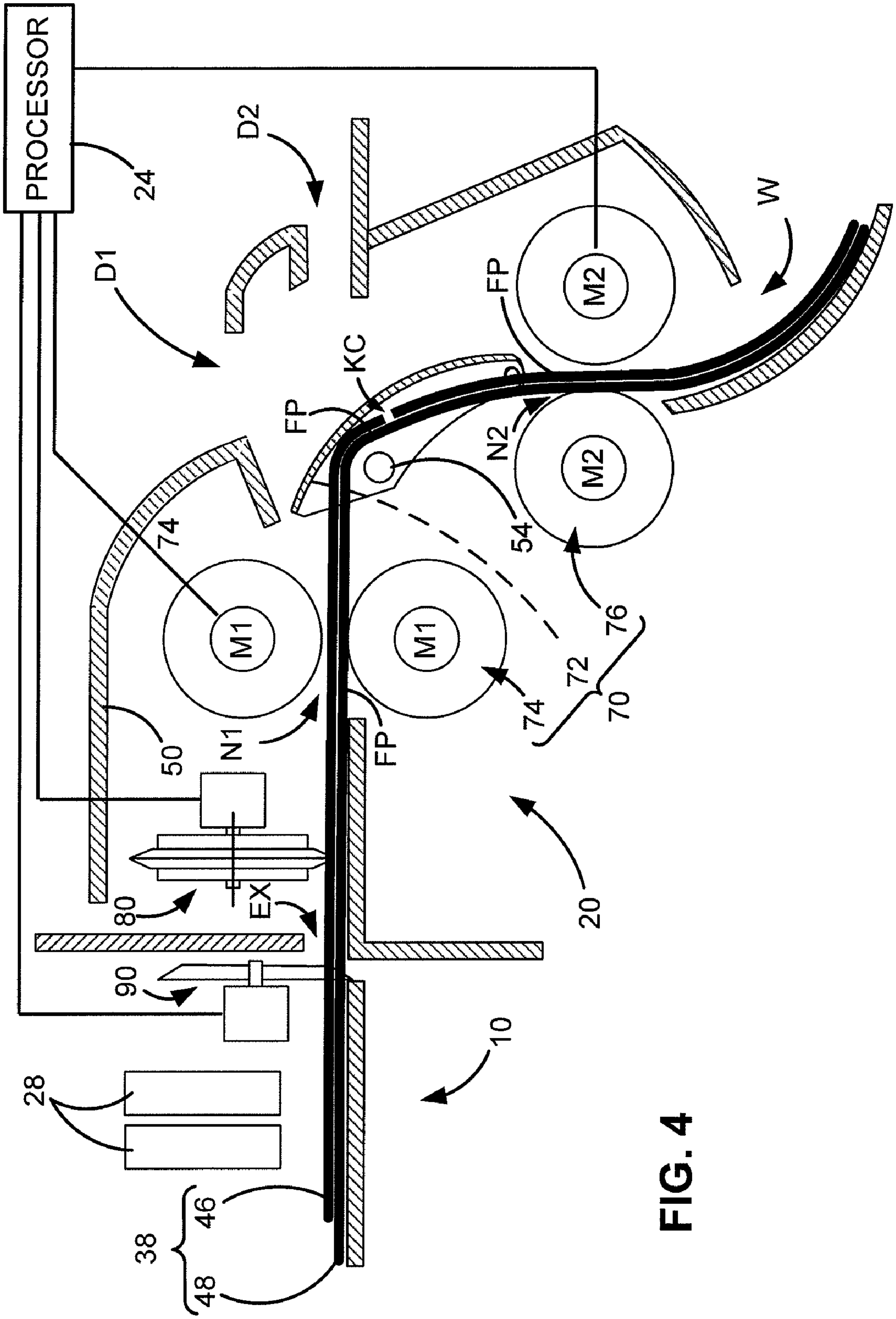
FIG. 4 depicts the label dispensing system in the first operating mode wherein the label material is paid-out downstream of the peeler bar while the peeler bar is in a first position.
Figure 5:
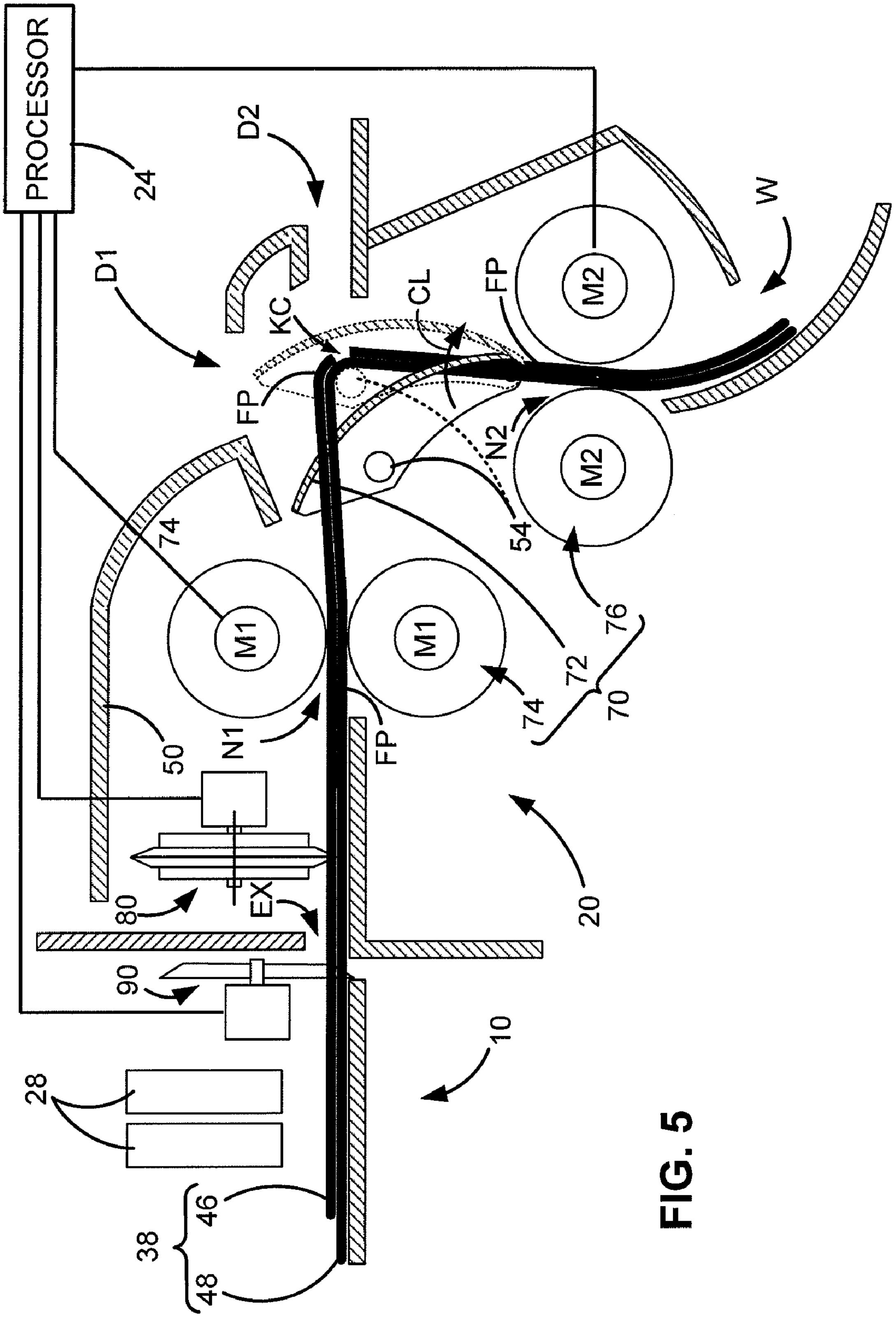
FIG. 5 depicts the label dispensing system in the first operating mode wherein the peeler bar pivots from the first position to a second position to engage the label material and effect an abrupt directional change in the feed path thereof.
Figure 6:
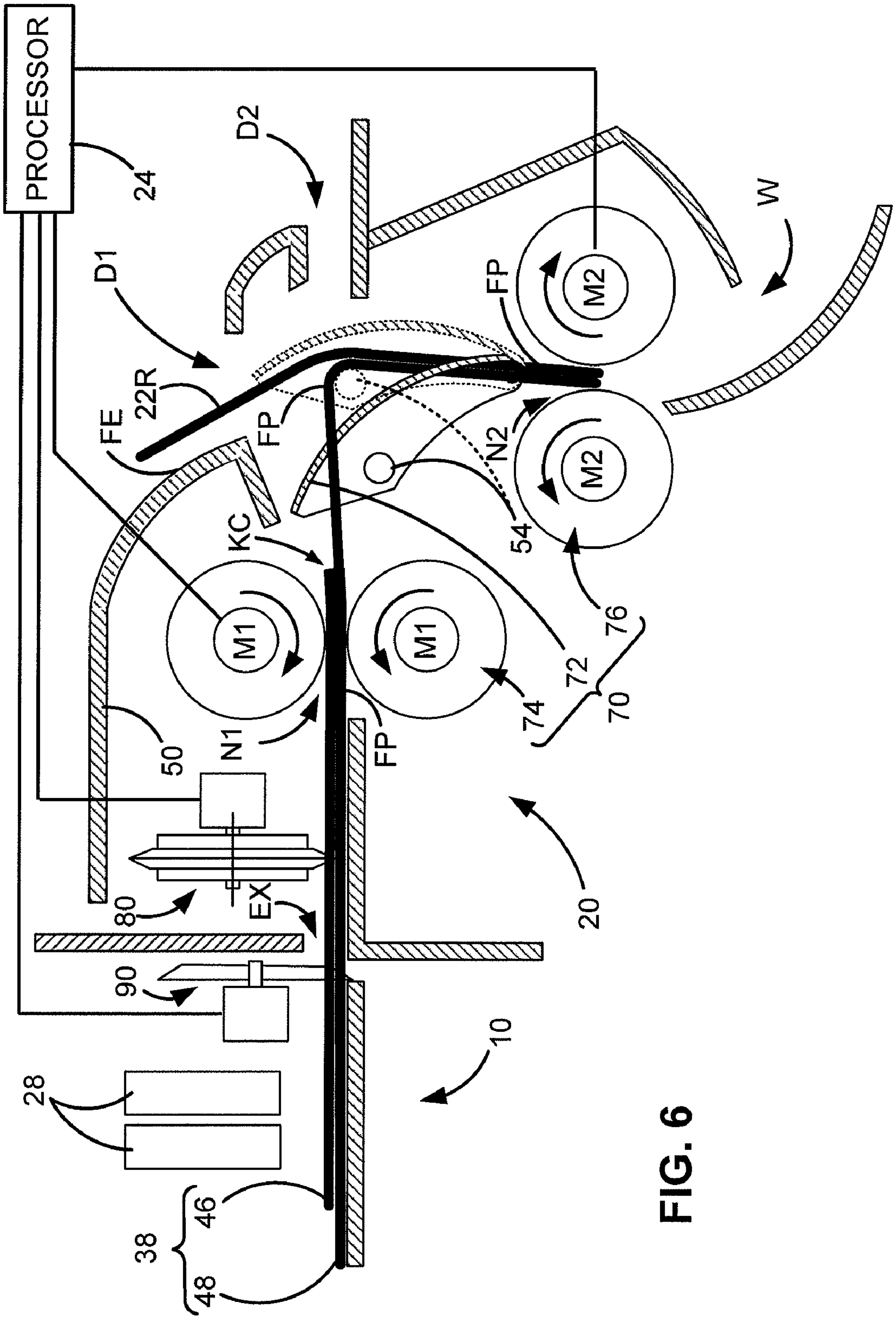
FIG. 6 depicts the label dispensing system in the first operating mode wherein the label material is retracted or taken-in such that the trailing edge of a printed label separates from the liner material and an application ready label is dispensed through a first dispensing outlet of the housing.

In FIG. 4, the label material 48 is paid-out further such that the kiss-cut KC extends past, or downstream of the peeler bar 54. In FIG. 5, the peeler bar 54 pivots, in a clockwise direction CL, from the first position (shown in solid lines) to the second position (shown in dotted lines) and engages the liner material 48 such that label material is pulled taut between the first and second nips N1, N2 of the rollers 74, 76. Furthermore, the peeler bar 54 effects an abrupt directional change in the feed path FP, i.e., introducing about a ninety (90) bend in the label material 38. In FIG. 6, the first and second pairs of rollers 74, 76 take-in the label material 38 such that the trailing edge TE of the printed label 22 separates from the liner material 48. The label material 38 is displaced until a portion of an application ready label 22R extends through, and is dispensed from, the first dispensing outlet D1. It will be recalled from the previous description of the peeler bar 54 that the convex peripheral surface CS (see FIG. 2*a*) induces an arcuate shape to the printed label 22R. As such, the curvature increases the stiffness of the label 22R to facilitate separation thereof from the liner material 48. Furthermore, the curvature imparts a degree of buckling stability and prevents the label 22R from contacting a forward edge FE of the dispensing outlet D1 as the application ready label 22R awaits removal by an operator.

In another embodiment of the invention, separation of the application ready label 22R may be further enhanced/augmented by driving the first and second pairs of rollers at differential speeds. That is, the processor 24 may issue a command signal to drive motor M1 at a higher speed than motor M2, thereby driving the first pair of rollers 74 at a higher speed than the second pair of rollers 76. Accordingly, a tensile load is imparted to the liner material 48 as it passes over the peeler bar 54. The increased tensile load enhances frictional engagement with the peeler bar 54 and, accordingly, separation of the printed label 22R from the underlying liner material 48.

Figure 7:
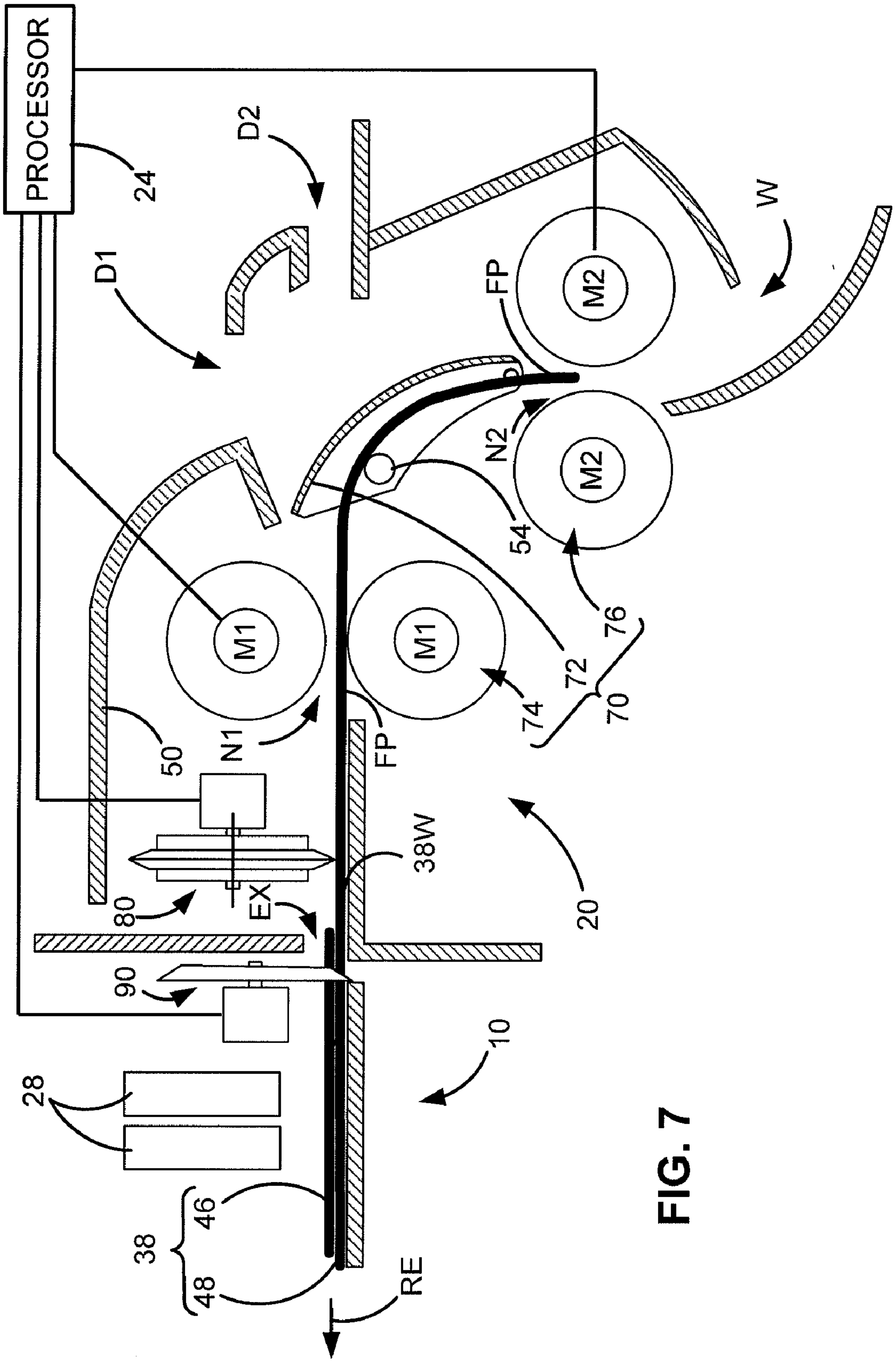
FIG. 7 depicts the label dispensing system in another operating mode, related to the first operating mode, wherein waste material including the liner material and any remaining face material is retracted or taken-in and cut by a second cutting apparatus, upstream of the first cutting apparatus.
Figure 8:
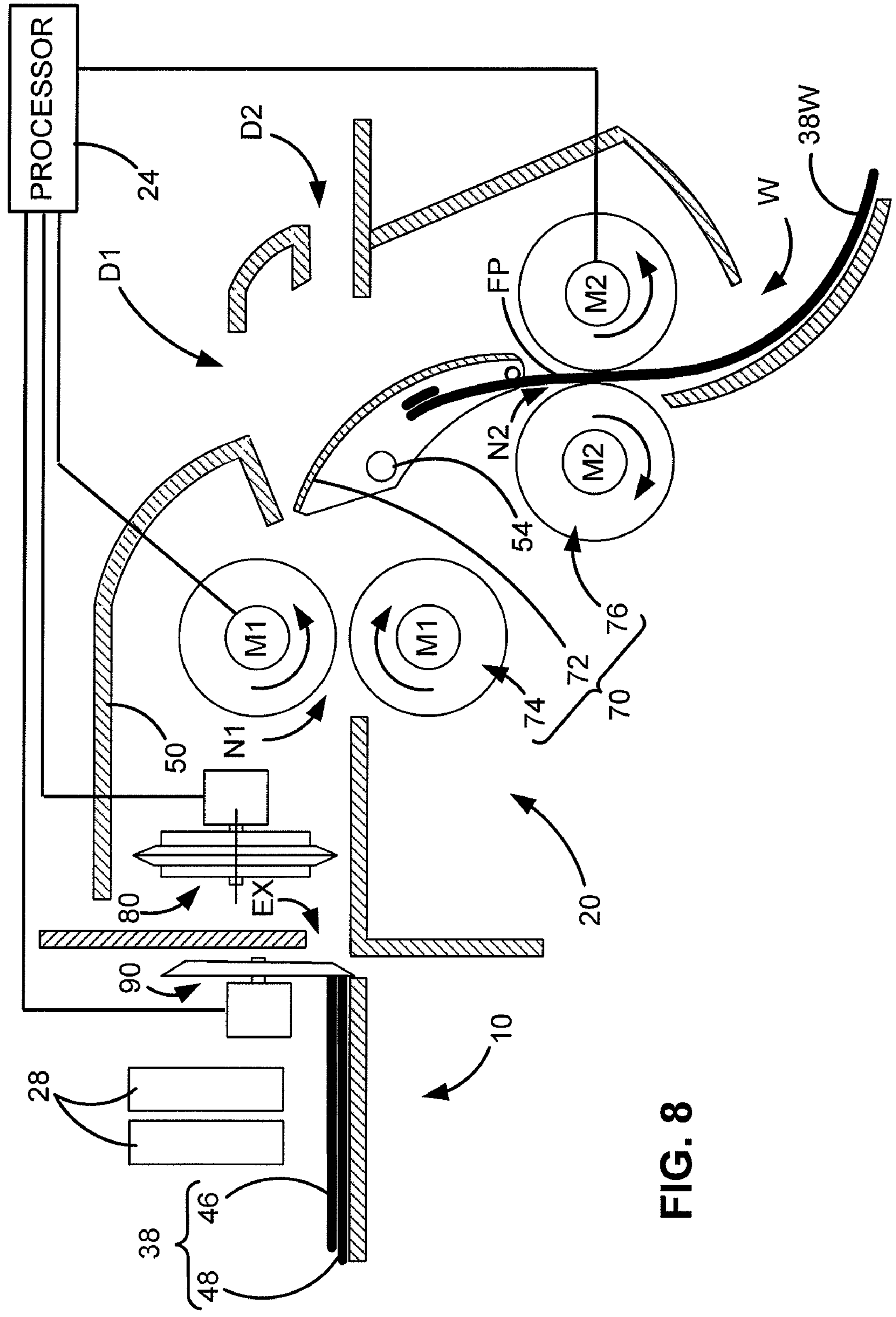
FIG. 8 depicts the label dispensing system in the other operating mode wherein the waste material is directed downwardly by a deflector guide and through a waste outlet disposed along the liner material, and any remaining face material, following the dispensation of an application ready label.

In FIGS. 7 and 8, the second operating mode is depicted wherein the application ready label (not shown) has been removed and the label material 38 is reeled, or taken-in, in the direction of arrow RE. The label and/or liner material 38, 48 may be taken-in by the web/spool of supply material or via the first or second pair of rollers 74, 76 while the deflector guide 72 is returned to the first position (shown in solid lines). When the previous kiss-cut KC has nearly reached or moved past the second cutting apparatus 90, the motion of the label and/or liner material 38, 48 is paused (see FIG. 7) to cut the remaining waste material 38W, i.e., principally liner material 48 however, a small portion of face material 46 may be included to effect a clean cut through the label material 38.

In FIG. 8, the deflector guide 72 receives and guides the waste material 38W through the waste outlet W. The position of the waste outlet W, i.e., below the first and second dispensing outlets D1, D2, facilitates removal and collection of waste material 38W in a waste receptacle (not shown). That is, the waste outlet W is disposed through a lower portion of the housing 50 such that gravity may augment the release and removal of the waste material 38W.

In FIGS. 9 and 10, the third operating mode of the label dispensing system 20 is depicted wherein a stream or stack of printed labels 22L is produced and dispensed through the second dispensing outlet D2. More specifically, in FIG. 9, the deflector guide 72 is pivoted in a counter-clockwise direction CC from the first position (shown in solid lines) to the second position (shown in dashed lines) toward the first pair of rollers 74. The label material 38 is paid-out through the first pair of rollers 74 such that the liner material 48 thereof rides along, and is supported by, the outer surface $72_{OS}$ of the deflector guide 72. Furthermore, the label material 38 is paid-out and paused such that the first cutting apparatus 80 may produce a kiss-cut KC through the face material 46 immediately upstream of the postage indicia and/or image printed on the face of the label material 38. While the label material 38 is being paid-out, a subsequent label 22 may be printed at the print station 12 or, alternatively, the label material 38 may be retracted/reeled-in subsequent to producing the kiss-cut, and advanced/paid-out during print operations to maximize utilization of the label material 38, i.e., to minimize gaps of empty space or non-printing area between consecutive labels 22. Notwithstanding the synchronization of the printing and dispensing operations, in FIG. 10, the label material 38 is paid-out, kiss-cut between each printed label 22L, and dispensed through the second dispensing outlet D2. Once the number of lined labels 22L have been printed, the second cutting apparatus 90 severs the label material 38 to separate the stream of lined labels 22L from the supply 36. Alternatively, individual lined labels 22L may be produced and dispensed through the outlet D2 by severing each lined label 22L from the upstream supply 36 and conveying each through the first pair of rollers 74 while being guided and supported along the upper or outer surface of the deflector guide 72. In another embodiment of the invention, the stream or individual lined-labels 22L may include one or more tabs (not shown) upstream of a kiss cut, or between consecutive kiss-cuts, to facilitate removal of the liner material 48. That is, the first cutting apparatus 80 may produce consecutive kiss-cuts, or a kiss-cut followed by a thru-cut made by the second cutting apparatus 90, such that a small gripper tab of face material 46 remains therebetween. The gripper tab facilitates separation of the printed label from the liner as the operator uses the tab to bend the lined-label about the kiss cut.

In summary, the system for dispensing labels 22 operates in any of three modes to dispense printed labels 22R in a condition ready for application, waste material 38W, and lined labels 22L which may be used at any time or at any location produced. A first mode of operation dispenses application ready labels 22R through a first dispensing outlet D1. The application ready label 22R is dispensed upwardly by separating the trailing edge of the adhesive-backed label 22R from the protective liner material 48. The system, therefore, presents the label 22R in an optimum orientation for immediate application. A second mode of operation discards waste material 38W through a bottom/lower waste outlet W and uses gravity to augment collection and removal of waste material 38W, i.e., into a waste receptacle. A third mode of operation dispenses lined labels 22L though a second dispensing outlet D2, disposed between the first dispensing and waste outlets D1, W. The lined labels 22L may be dispensed as a stream of tandemly arranged printed labels 22L or stacked for individual use at a subsequent time or at a remote location.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A system for dispensing adhesive-backed labels, the labels being fabricated from a label material having an adhesive-backed face material and a liner material operative to carry the face material along a feed path, the system comprising:

a housing defining a first dispensing outlet;

a system, supported within the housing, for conveying a supply of label material along a feed path and operative to bi-directionally displace the label material along the feed path, the label material, furthermore, having a cut across the width of the face material to define a trailing edge of each label;

a peeler bar positionable within the housing from a first position to a second position, operative to engage the label material to effect an abrupt directional change in the feed path thereof, and operative to cause the face material to separate from the liner material thereby producing an application ready label;

a processor, operative to control the conveyance system and the position of the peeler bar within the housing, the processor causing the conveyance system to: (i) pay out the label material such that the trailing edge of the label passes downstream of the peeler bar when the peeler bar is in the first position, (ii) take-in the label material such that trailing edge of the adhesive backed label separates from the liner when the peeler bar is in the second position, and (iii) dispense the application ready label through the first dispensing outlet.

2. The system according to claim 1 wherein the cut across the width dimension of the label material is produced by a first cutting apparatus operative to produce a kiss-cut through the face material of the label material and wherein the processor is operative to control the displacement of the label material relative to the first cutting apparatus to vary the length dimension of a printed label.

3. The system according to claim 2 wherein the first cutting apparatus includes a disc-shaped cutter having a cutting edge and a rotational axis parallel to the feed path of the label material, the disc-shaped cutter including a least one bearing surface radially inboard of the cutting edge to control the depth of the kiss-cut into the label material.

4. The system according to claim 3 wherein the disc-shaped cutter includes a bearing surface on each side of the cutting edge.

5. The system according to claim 2 further comprising a second cutting apparatus disposed upstream of the first cutting apparatus to cut through the label material and produce a length of waste material, and wherein the processor is operative to control the operation of the second cutting apparatus and conveyance system such that the waste material is dispensed through a waste outlet of the housing.

6. The system according to claim 1 wherein the supply of label material includes a plurality of kiss-cuts at predetermined intervals along the length of the material supply.

7. The system according to claim 1 wherein the peeler bar includes a peripheral surface slideably engaging the liner material of the label material and wherein the peripheral surface has a convex curvature to impart a complimentary curvature and increased bending stiffness to the application ready label.

8. The system according to claim 1 wherein the conveyance system includes:

a first pair of rollers defining a first drive nip for bi-directionally driving the label material along a first portion of the feed path, and a second pair of rollers defining a second drive nip, downstream of the first drive nip, for bi-directionally driving the label material along a second portion of the feed path, and wherein the peeler bar is disposed between the first and second drive nips and frictionally engages the liner to effect an abrupt directional change in the first and second portions of the feed path when the peeler bar is in the second position.

9. The system according to claim 1 wherein the peeler bar induces tensile loads into the liner of the label material when the peeler bar is in the engaged position and wherein the processor drives the first and second pair of rolling elements at a differential speed to increase the tensile loads in the liner and augment separation of the label therefrom.

10. A system for dispensing adhesive-backed printed labels, the printed labels being fabricated from a label material having an adhesive-backed face material and a liner material juxtaposed the adhesive backing of the face material, the system comprising:

a housing defining a first dispensing outlet and a second dispensing outlet;

a system, supported within the housing, for conveying a supply of label material along multiple feed paths, the system having (i) a first pair of rollers defining a first drive nip, (ii) a second pair of rollers defining a second drive nip, and (iii) a deflector guide disposed between the first and second drive nips, the drive nips operative to engage and bi-directionally displace the label material along a first feed path, the deflector guide positionable from a first position to a second position and operative to guide the label material along the first and a second feed path, the label material, furthermore, having a cut across the width of the face material to define a trailing edge of each printed label;

a peeler bar positionable within the housing from a first position to a second position, operative to engage the label material to effect an abrupt directional change in the feed path thereof, and operative to cause the face material to separate from the liner material to produce an application ready printed label;

a processor, operative to control the conveyance system and position of the peeler bar within the housing, such that in a first operating mode, the processor causes the conveyance system to: (i) pay out the label material such that the trailing edge of the printed label passes downstream of the peeler bar when the peeler bar is in the first position, (ii) move the deflector guide into the first position to guide the label material from the first drive nip to the second drive nip, and (iii) take-in the label material such that trailing edge of the adhesive backed printed label separates from the liner material and is dispensed through the first dispensing outlet when the peeler bar is in the second position, and in a second operating mode, the processor causes the conveyance system to: (i) move the deflector guide from the first position to the second position to guide a plurality of lined printed labels through the second dispensing outlet.

11. The system according to claim 10 wherein the peeler bar is pivotally mounted within the housing by a pair of pivot arms, each of the pivot arms being affixed to an end of the peeler bar at one end thereof and mounting about a pivot axis of the peeler bar at the other end thereof, and wherein the defector guide is integrated with the pivot arms and pivots about the pivot axis of the peeler bar.

12. The system according to claim 10 wherein the cut across the width dimension of the label material is produced by a first cutting apparatus operative to produce a kiss-cut through the face material of the label material and wherein the processor is operative to control the displacement of the label material relative to the first cutting apparatus to vary the length dimension of a printed label.

13. The system according to claim 12 wherein the first cutting apparatus includes a disc-shaped cutter having a cutting edge and a rotational axis parallel to the feed path of the label material, the disc-shaped cutter including a least one bearing surface radially inboard of the cutting edge to control the depth of the kiss-cut into the label material.

14. The system according to claim 13 wherein the disc-shaped cutter includes a bearing surface on each side of the cutting edge.

15. The system according to claim 12 further comprising a second cutting apparatus disposed upstream of the first cutting apparatus to cut through the label material and produce a length of waste material, wherein the housing includes a waste outlet, and wherein, in another operating mode, the processor is operative to control the second cutting apparatus and the conveyance system such that the waste material is dispensed through the waste outlet of the housing.

16. The system according to claim 10 wherein the peeler bar includes a peripheral surface slideably engaging the liner material of the label material and wherein the peripheral surface has a convex curvature to impart a complimentary curvature and increased bending stiffness to the application ready printed label.

17. A mailing machine, comprising:

a print station adapted to print postage indicia on a face surface of one of a mailpiece envelope and an adhesively-backed label having an adhesive-backed face material and a lining material covering the adhesive backing of the face material, the print station having a print head adapted to move from a first position to a second position wherein, in the first position, the print head is disposed along the feed path of a processed mailpiece, and, in the second position, the print head is disposed along the feed path of the label material;

a mailpiece transport system operative to convey a sealed mailpiece across the print head of the print station to receive the postage indicia, a postage label fabrication and dispensing system including:

a supply of label material;

a label transport system for conveying a supply of label material across the print head of the print station to receive the postage indicia and operative to bi-directionally displace the label material along the feed path;

a first cutting apparatus adapted to produce a cut across the width dimension of the face material, the cut defining a trailing edge of each label;

a peeler bar disposed substantially orthogonal to the feed path, positionable within a housing from a first position to a second position, operative to engage the label material to effect an abrupt directional change in the feed path thereof, and operative to cause the face material to separate from the liner material to produce an application ready printed label;

a processor, operatively coupled to the print station, mailpiece transport system, and postage label fabrication and dispensing system, the processor controlling the label transport system and the position of the peeler bar to: (i) pay out the label material such that the trailing edge of the label passes downstream of the peeler bar when the peeler bar is in the first position, and (ii) take-in the label material such that trailing edge of the label separates from the liner when the peeler bar is in the second position and (iii) dispense an application ready label through a dispensing outlet.

18. The mailing machine according to claim 17 wherein the cut across the width dimension of the label material produces a kiss-cut through the face material of the label material and wherein the processor is operative to control the displacement of the of the label material relative to the first cutting apparatus to vary the length dimension of a printed label.

19. The mailing machine according to claim 18 further comprising a second cutting apparatus disposed upstream of the first cutting apparatus to cut through the label material and produce a length of waste material, and wherein the processor is operative to control the second cutting apparatus and the label transport system such that the waste material is dispensed through a waste outlet.

20. The mailing machine according to claim 18 wherein the first cutting apparatus produces consecutive kiss-cuts through the face material along a length of label material thereby producing a plurality of lined-labels and wherein the processor is operative to dispense the lined-labels through a dispensing outlet.

* * * * *